United States Patent [19]
Robitaille

[11] Patent Number: 4,893,101
[45] Date of Patent: Jan. 9, 1990

[54] RESETTABLE GROUND FAULT CIRCUIT INTERRUPTER

[75] Inventor: James M. Robitaille, Cleveland, Ohio

[73] Assignee: Ericson Manufacturing Company, Willoughby, Ohio

[21] Appl. No.: 327,012

[22] Filed: Mar. 22, 1989

Related U.S. Application Data

[63] Continuation of Ser. No. 260,877, Oct. 21, 1988, abandoned.

[51] Int. Cl.$^4$ ..................... H01H 83/02; H01H 50/58; H02H 3/16

[52] U.S. Cl. ...................................... 335/18; 335/164; 335/186; 335/254; 361/42

[58] Field of Search ................. 335/18, 164, 186, 131, 335/200, 126, 254, 293, 20; 361/42, 49; 307/119

[56] References Cited

U.S. PATENT DOCUMENTS

| | | | |
|---|---|---|---|
| 3,568,114 | 3/1971 | Cherry et al. | 335/186 |
| 3,873,951 | 3/1975 | Blake | 335/164 |
| 3,987,266 | 10/1976 | Betz . | |
| 4,010,432 | 3/1977 | Klein et al. . | |
| 4,048,599 | 9/1977 | Groth . | |
| 4,075,584 | 2/1978 | Castonguay et al. . | |
| 4,086,643 | 4/1978 | Jacobs . | |
| 4,209,762 | 6/1980 | Samborski et al. | 335/18 |
| 4,329,669 | 5/1982 | Krasser et al. . | |
| 4,564,730 | 11/1986 | Tomizu et al. . | |
| 4,567,456 | 1/1986 | Legatti . | |
| 4,595,894 | 6/1986 | Doyle et al. . | |
| 4,620,171 | 10/1986 | Bagalini . | |
| 4,719,437 | 1/1988 | Yun . | |

*Primary Examiner*—H. Broome
*Attorney, Agent, or Firm*—Regan J. Fay

[57] ABSTRACT

A resettable circuit interrupter in a ground fault detector circuit utilizes a housing which slideably retains a solenoid coil wound on a bobbin. A contact carrier is attached to the bobbin and one or more moveable contacts are provided on the carrier opposite a corresponding set of fixed contacts. A plunger slides through a central passageway in the solenoid coil. The bobbin is spring biased so that the contacts are in a normally open position. In a manually resettable version, when the solenoid coil conducts a predetermined current, manually activating the plunger causes the plunger to magnetically couple to a footplate attached to the bobbin. When a plunger spring returns the plunger to its original position, the bobbin and contact carrier move with it and the contacts are closed. When the solenoid coil conducts insufficient current to magnetically couple the plunger and footplate, the bias springs maintain the contacts in the normally open position. In an electrically resettable version the contacts may be reset by electromagnetic energy alone, without manual activation of the plunger.

10 Claims, 4 Drawing Sheets

RESETTABLE GROUND FAULT CIRCUIT INTERRUPTER

This application is a continuation-in-part of copending application Ser. No. 260,877 filed Oct. 21, 1988 now abandoned.

BACKGROUND OF THE INVENTION

The present invention relates to switching devices used to interrupt one or more circuit connections, particularly power line conductors in response to signals from ground fault protection circuitry. The invention provides a resettable switching device that can be reset only when certain preconditions are satisfied.

Ground fault protective devices used in a permanently connected installation (such as a wall box) require only that the hot or "live" conductor be interrupted in the event of a ground fault. However, in portable power equipment employing ground fault protective devices the neutral conductor could become disconnected due to rough handling, etc. and the protective circuit deenergized. A fault current between the hot conductor and ground would then go undetected through loss of the neutral conductor. This possibility has prompted U.L. to require that non-permanently connected ground fault protective equipment in this country include means for detecting an open neutral conductor.

The means usually employed includes a separate device such as a self-latching relay that will maintain load circuit continuity only so long as both hot and neutral conductors are connected. These relay devices tend to be bulky and expensive and awkward for use with portable equipment.

Other known resettable circuit interrupt devices typically utilize complicated mechanisms to set and reset the contacts. These mechanical arrangements have tended to be complex and intricate because one necessary safety requirement is that the device must not be capable of being reset unless a safe circuit is present. This complexity, however, drives up manufacturing costs and reduces reliability.

Accordingly, the need exists for a resettable circuit interrupter that is simple in design, avoids complex mechanisms for actuating circuit connection and thereby provides a low cost yet reliable means for setting and resetting the device.

SUMMARY OF THE INVENTION

The present invention provides a device that is used as a circuit interrupter but which can be reset only upon certain preconditions being satisfied. The device uses a minimum number of parts to make and break a circuit connection, and provides a reset without the complex mechanical arrangements known heretofore.

According to one aspect of the invention, the device utilizes one or more pairs of electrical contacts. For each pair of contacts, one contact is fixed relative to the other moveable contact. The moveable contact is mounted on a contact carrier which is attached to a solenoid coil bobbin. The solenoid coil and bobbin are slidably retained by a housing and are biased by a spring so that each contact pair is normally open.

Actuation (set and reset) of the device is accomplished by means of a plunger which fits through a central passageway in the solenoid and is slideable with respect to the solenoid. Whenever the solenoid is conducting a predetermined current the plunger is magnetized and magnetically engages or contacts a footplate attached to the solenoid bobbin.

In one form, the device is manually actuated and the plunger must be manually operated to magnetically engage the footplate. A plunger bias spring causes the plunger and magnetically coupled solenoid bobbin to move thereby closing the contacts.

In another form, the device is electrically actuated and the plunger caused to engage the footplate solely by magnetic flux produced by the solenoid.

Since operation of the device relies solely on the absence or presence of a magnetic field provided by a predetermined minimum current in the solenoid coil, no mechanical latching arrangement is necessary. Therefore, switching is provided with a minimum number of non-intricate parts.

The manually actuated form of this invention makes use of the property of magnetic amplification in a solenoid device. That is, the amount of current or force required to push or pull a spring biased contact carrying member into a closed position from rest is much greater than the current or force required to hold that member in position once closed. This is because a magnetic circuit is completed from the solenoid frame through the core of the coil once the plunger has made contact with the footplate. In the manually actuated form of the present invention, no pull-in current is required to move the plunger and complete the magnetic circuit. The mechanical force required is provided manually through a conveniently positioned actuating knob. Since a relatively small holding current is required, electronic components of the ground fault protective circuitry can be reduced in size to provide a smaller, less expensive package.

In the electrically actuated form of the device, pull-in current is provided to the solenoid coil when the protected power equipment is plugged into a power outlet. Holding current is diverted from the solenoid when a ground fault is detected. The device may be reset electrically by operating a switch to provide pull-in current to the coil.

In each form of the device, the associated ground fault detecting circuitry is designed to detect an imbalance or undervoltage condition in the hot and neutral power lines and remove current from the solenoid coil. With normal or "safe circuit" conditions restored, however, the circuit interrupting device can be reset, manually or electrically.

DESCRIPTION OF PREFERRED EMBODIMENTS

Figure 1:
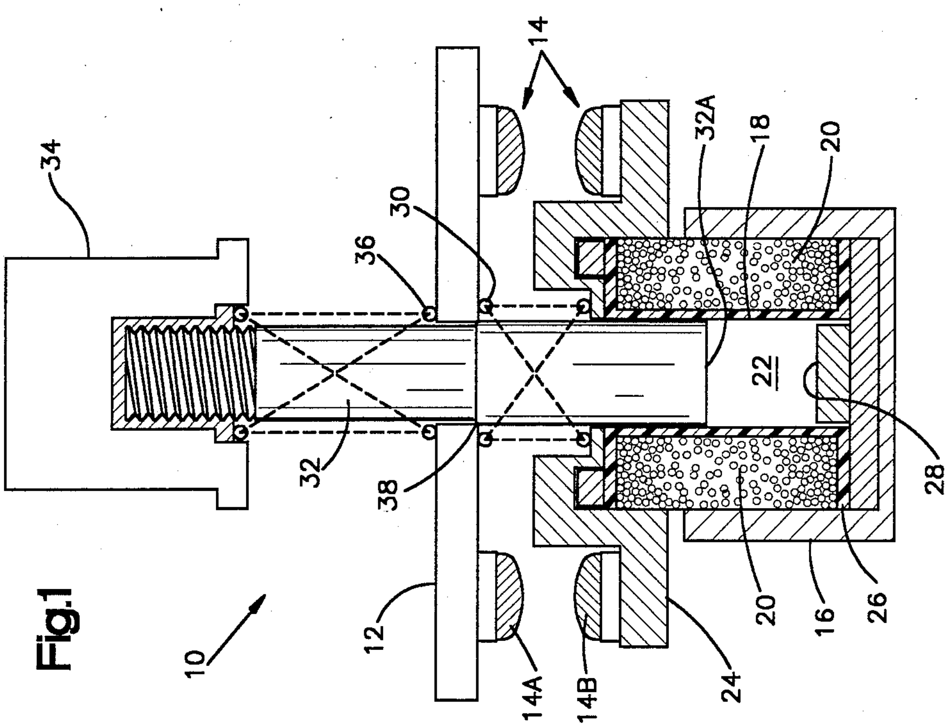
FIG. 1 is a cross-section of a manually activated device present invention with the device shown in the deactivated or de-energized state.

With reference to FIG. 1, a manually activated circuit interrupt device embodying the present invention is generally indicated by the numeral 10. The device 10 is depicted being used in a typical manner such as mounted on a printed circuit board 12 for use as part of a ground fault protection circuit shown in FIG. 4 and described below.

The device 10 includes one or more pairs of electrical contacts 14 (two pairs are shown in FIG. 1). The contacts may be used to connect power to protected portable power equipment. One contact 14*a* of each contact pair is preferably mounted on the circuit board 12 and is hereinafter referred to as the "fixed" contact 14*a*. The other contact 14*b* of each contact pair is moveable relative to its corresponding fixed contact in a manner described hereinbelow.

The device 10 further includes a cylindrical or rectangular housing 16 which retains and preferably substantially encloses a solenoid coil bobbin 18. The bobbin 18 has wire coils 20 wound thereon to form a solenoid with an open concentric central passageway 22 therethrough. The coil bobbin 18 and coil 20 are adapted to slide easily within the housing 16. Coil 20 may be connected to ground fault detection circuitry.

A contact carrier 24 is attached to one end of the bobbin 18 with each moveable contact 14*b* mounted thereon opposite its corresponding fixed contact 14*a*. The opposite or distal end of the bobbin 18 has a flange 26. A metal footplate 28 is attached to the flange 26. The relative positions of the moveable contacts 14*b* with respect to the fixed contacts 14*a* are such that when the bobbin 18 is seated at the bottom of the housing 16 as in FIG. 1, the contacts are electrically open. However, the bobbin 18 can slide sufficiently upward or axially so as to cause closure of the contacts 14 as will be further explained.

A compression bias spring 30 is positioned between the circuit board 12 and the bobbin 18 so as to exert an axial force on the bobbin. This force tends to move the bobbin 18 towards the bottom of the housing 16, thereby opening the contacts 14. Thus, the contact pairs 14 are said to be "normally open."

A plunger 32 is provided with a convenient manual actuation knob 34 at one end. The plunger 32 is arranged so as to slide within the passageway 22 through the solenoid. A plunger bias spring 36 is disposed between the knob 34 and the circuit board 12 and exerts a force which tends to shift the distal end of the plunger 32 up or away from the bottom of the housing 16. A shoulder 38 is provided on the plunger 32 to abut the circuit board 12 when the plunger is in the up position thereby preventing the plunger 32 from dropping out of the device 10. When the plunger 32 is manually actuated by applying an axial force to the knob 34, the plunger 32 is pushed until the distal end 32*a* thereof contacts or engages the footplate 28.

Operation of device 10 is as follows (with reference predetermined current is being conducted through the solenoid coil 20, depressing the plunger 32 has no effect, the contacts 14 cannot close even momentarily, and the device 10 returns to the position shown in FIG. 1. Thus, the contacts 14 are electrically open because the bias spring 30 pushes the bobbin 18 and contact carrier 24 away from the circuit board 12 and fixed contacts 14*a*.

Figure 2:
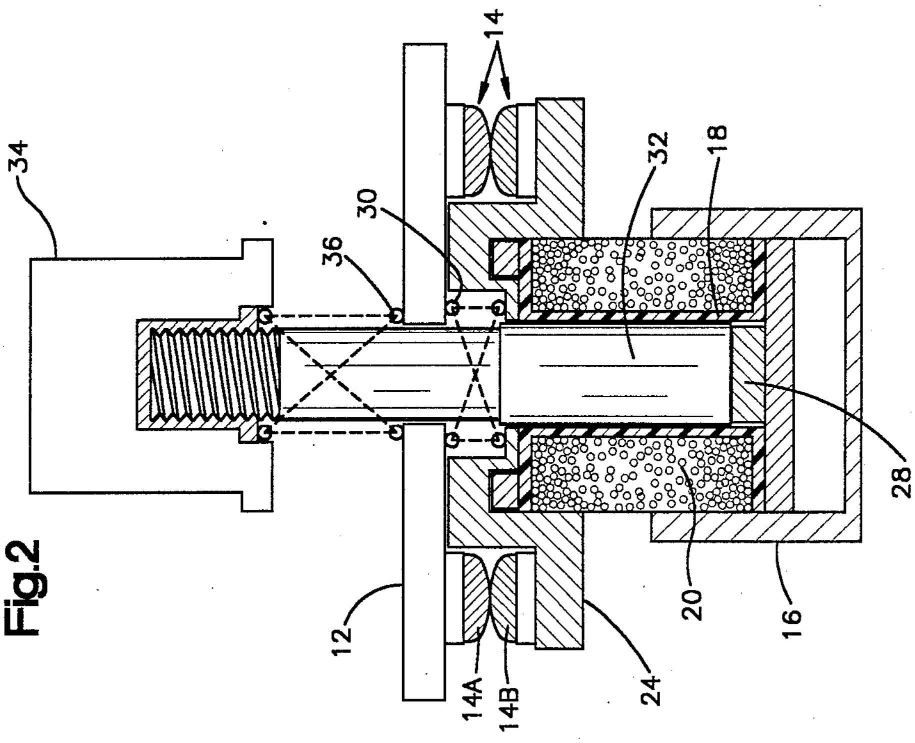
FIG. 2 is a view similar to that in FIG. 1 but with the device activated energized.

Assume now that current is being conducted through the coil 20. The magnetic field created by the solenoid coil magnetizes the plunger 32. When the plunger 32 is manually actuated by pushing the distal end 32*a* into contact with the footplate 28, the plunger 32 and footplate 28 are magnetically coupled. As shown in FIG. 2, when the manual force is released, the spring 36 returns the plunger 32 to its original position and the footplate 28, bobbin 18 and contact carrier 24 are likewise moved with the plunger 32 thereby closing the contacts 14.

The current conducted by the solenoid coil must exceed a predetermined value so that the magnetic coupling between the plunger 32 and footplate 28 is great enough to exceed the differential force of the springs 30, 36 tending to separate them. If the current falls below the minimum holding level (allowing for possible hysteresis), the springs 30, 36 cause separation of the plunger 32 and footplate 28 thereby causing the device 10 to return to the de-energized state shown in FIG. 1.

The device 10 cannot be manually reset or actuated until sufficient activation current is present in the coil 20. This precondition is of course satisfied by other circuitry, shown in FIG. 4 and described below, which provides the needed solenoid coil current only when it is electrically safe to permit closure of the contacts 14, or interrupts the activation current to the solenoid coil when an unsafe condition occurs (such as a ground fault) thereby de-energizing the device 10. It will now be appreciated that the solenoid coil activation current can be predetermined by appropriate selection of the springs 30, 36.

Figure 3:
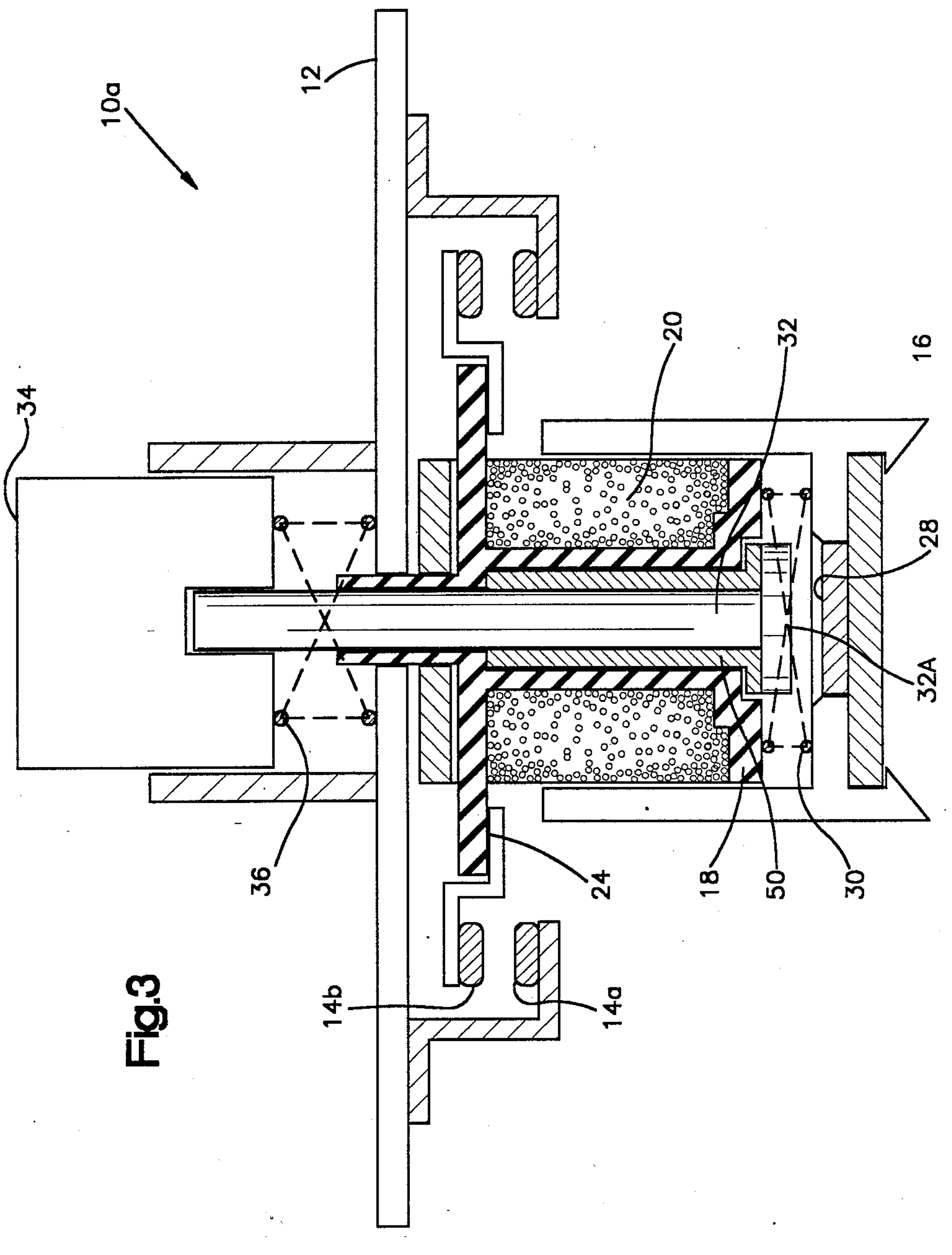
FIG. 3 is a cross-section of an alternative embodiment of the manually activated device.

An alternative embodiment of manually activated device is shown in FIG. 3. Most of the elements are the same as those in FIGS. 1 and 2 with the same numerals being used to designate like parts.

In the device 10 of FIG. 3, the solenoid coil 20 is slideably retained by the housing 16. However, the footplate 28 is mounted within the housing 16 and not attached to the bobbin 18. The bobbin 18 has a concentric metallic sleeve 50 within the central passageway 22. The sleeve 50 is attached to the bobbin 18 and the plunger 32 slides within the sleeve 50.

The plunger 32 includes a flange 32*a* at its distal end. When the coil 20 is energized, the plunger 32 magnetically engages and is held to the sleeve 50. Thus, when a force is manually applied to the knob 34, the plunger 32 is pushed down along with the entire solenoid coil 20, bobbin 18 and contact carrier 24 thereby closing the contacts 14. That is, the magnetic coupling between the plunger 32 and the sleeve 50 causes the entire assembly to slide towards the bottom of the housing 16. When the plunger flange 32*a* contacts the footplate 28 it is magnetically held in position so long as the coil current exceeds the predetermined holding value. If the current drops below such value or goes to zero, springs 30 and 36 return the bobbin and plunger to the position shown in FIG. 3.

An advantage of the design in FIG. 3 is that the depressed knob 34 provides an immediate visual indication to the user that the contacts are being held closed. The tradeoff, of course, is the additional sleeve 50 piece used to engage the plunger 32 and bobbin 18.

Figure 4:
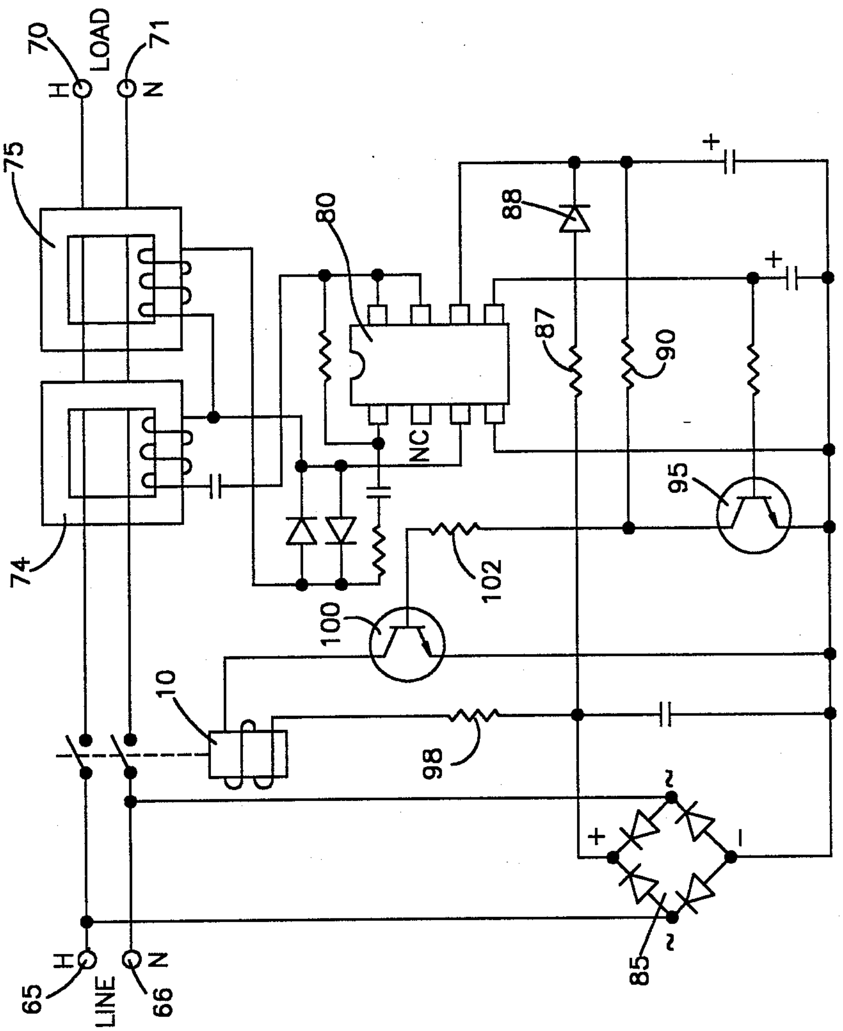
FIG. 4 is a schematic diagram of a control circuit for the manually operated devices of FIGS. 1 to 3.

In operation, the device 10 of FIGS. 1 to 3 is connected in the circuit of FIG. 4. In FIG. 4, line terminals 65 and 66 representing "hot" and "neutral" lines are intended for connection to a conventional A.C. outlet. Power is provided through terminals 65, 66 and contacts 14A, 14B of device 10 to terminals 70, 71 connected to a protected piece of power equipment. A pair of current transformers 74, 75 are provided to sense, respectively, current flow between the neutral line and ground and between the hot line and ground indicating a ground default. If any such ground fault current is sensed by transformer 74 or 75 a signal is provided to an integrated circuit 80, which in turn provides a signal on pin 5 indicating that a ground fault has been sensed. Preferably, integrated circuit 80 is a GFCI controller manufactured by Raytheon as part No. RV4145.

Power is supplied to the ground fault control circuit from terminals 65, 66 through a bridge rectifier 85. The output of bridge 85 is supplied through resistor 87 and diode 88 to integrated circuit 80 and through resistor 90 to the collector of a transistor 95. The base of transistor 95 is connected to pin 5 of integrated circuit 80. Transistor 95 remains nonconductive so long as no ground fault signal is received from pin 5 of integrated circuit 80.

The coil of circuit interrupt device 10 is connected to the output of bridge 85 through a current limiting resistor 98 and is connected to ground through a transistor 100. Transistor 100 is normally conductive by means of current supplied through resistor 90 and another resistor 102 to its base. With transistor 100 conductive, the coil of device 10 is supplied with current through limiting resistor 98 which limits the current to an amount sufficient only to hold contacts 14A, 14B closed after manual actuation, but not sufficient to lose the contacts against the bias provided by spring 30. Contacts 14A, 14B of device 10 cannot be closed by electrical energization alone of device 10, therefore, but also require mechanical energy applied to depress plunger 32.

If a ground fault is detected by transformer 74 or 75 a signal is provided to integrated circuit 80 which in turn provides a signal from pin 5 to the base of transistor 95. Transistor 95 is thereby rendered conductive and diverts current from the base of transistor 100 rendering it non-conductive. The coil of device 10 is thus deenergized and contacts 14A, 14B are opened. Device 10 can be reset only by manual actuation of plunger 32 and only after the detected ground fault has been cleared.

Figure 5:
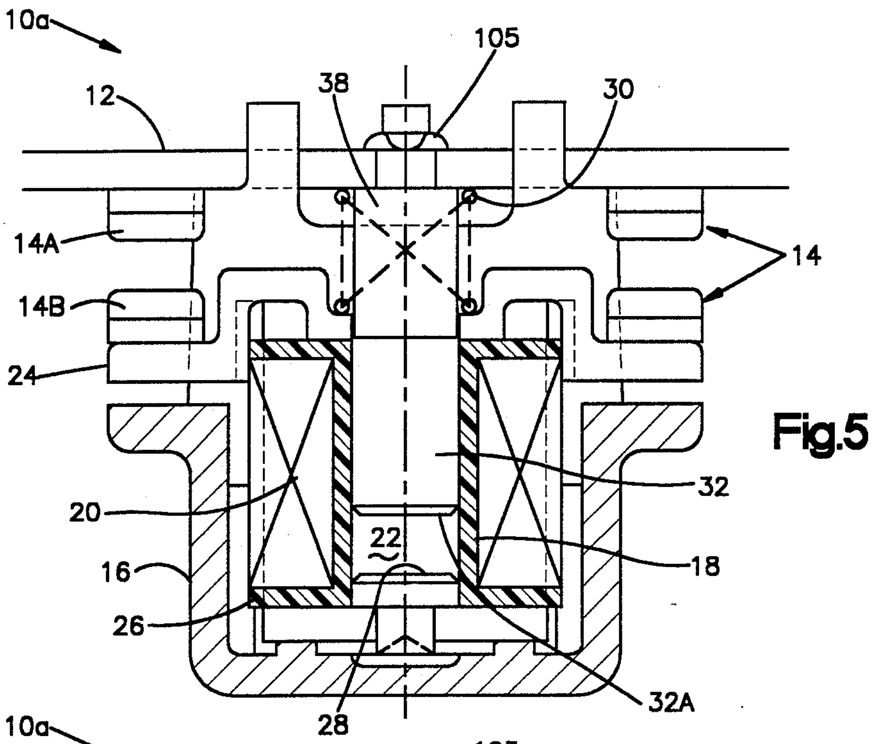
FIG. 5 is a cross-section of an electrically activated device of the invention in the deactivated state.
Figure 6:
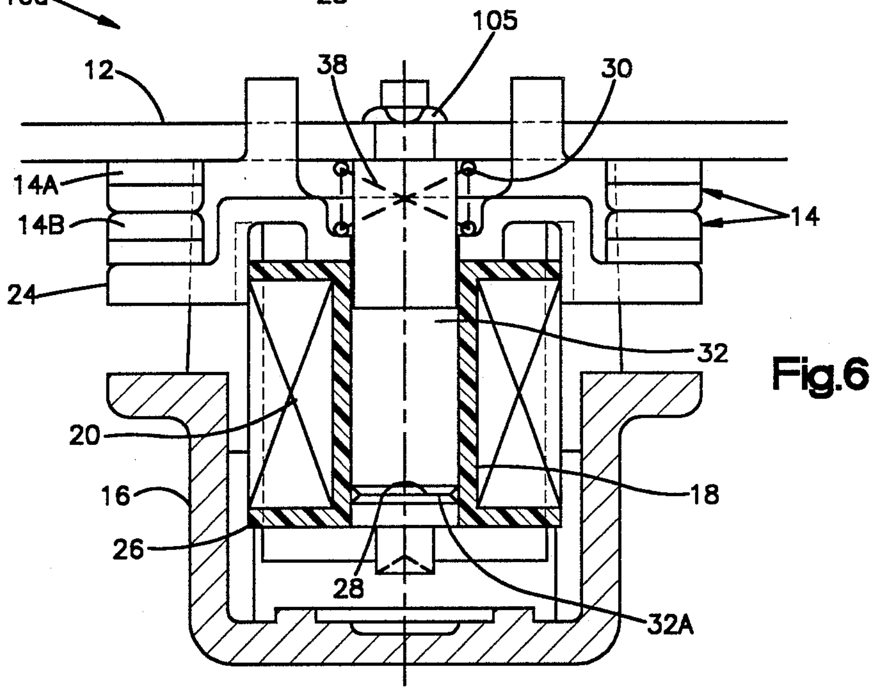
FIG. 6 is a view similar to FIG. 5 but with the device in the activated state.

FIGS. 5 and 6 show an electrically actuated form of circuit interrupter device embodying this invention. The same reference numerals employed in FIGS. 1 to 3 are used to indicate like or corresponding parts. In FIGS. 5 and 6, solenoid bobbin 18 is again slidably retained in housing 16. Plunger 32 has been lengthened to reduce the air gap between its lower end 32A and footplate 28. Also, there is no actuating knob for plunger 32 corresponding to knob 34 in FIGS. 1 to 3, nor compression spring corresponding to spring 36 in FIGS. 1 to 3. Instead, plunger 32 is retained in a substantially fixed position by retaining spring washer 105 held within a groove in the shaft of plunger 32. The air gap between plunger 32 and footplate 28 is preferably adjusted to be only slightly larger, on the order of 0.01 inch, than the normally open spacing between contacts 14A and 14B. This assures that upon closing of contacts 14A, 14B retaining spring washer 105 will compress slightly and maintain a constant tension on contacts 14A, 14B to eliminate contact bounce. Except for the differences noted, the electrically activated device of FIGS. 5 and 6 is substantially the same in structure as the devices of FIGS. 1 to 3.

Figure 7:
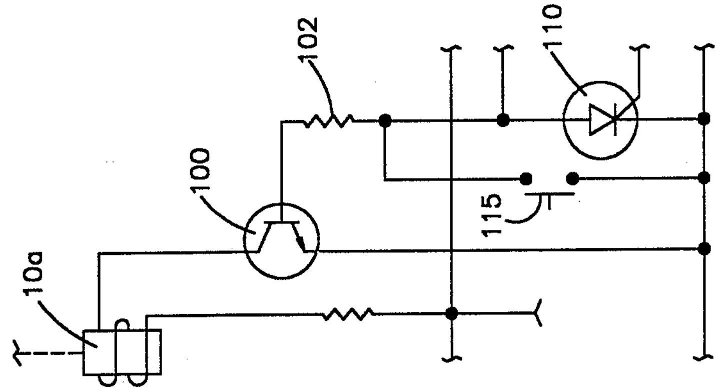
FIG. 7 is a partial schematic of a control circuit for the device of FIGS. 5 and 6 showing the differences from the circuit of FIG. 4.

In use, the device 10*a* of FIGS. 5 and 6 is connected in the circuit of FIG. 7 which is identical to that of FIG. 4 with the exceptions illustrated. In FIG. 7, current limiting resister 98 of FIG. 4 has been eliminated so that coil 20 can be supplied with pull-in current. In addition, transistor 95 has been replaced by SCR 110 and a push-button reset switch 115 is connected across the SCR.

In operation, coil 20 of device 10*a* is supplied with pull-in current through transistor 100 and contacts 14A, 14B are closed as soon as line terminals 65 and 66 are plugged into a power source. When a ground fault is detected, a signal from pin 5 of integrated circuit 80 is provided to the gate of SCR 110 causing the SCR to become conductive and divert base current from transistor 100. The coil of device 10*a* is deenergized and contacts 14A, 14B open. So long as line terminals 65 and 66 remain connected to a power source, SCR 110 will remain conductive. Transistor 100, however, will remain nonconductive and device 10*b* will be deenergized. Device 10*a* can be reset by operating reset push-button 115 to render SCR 110 nonconductive and permit pull-in current to be supplied to the coil of device 10*a* through transistor 100.

If line terminals 65 and 66 are disconnected from the power source following detection of a ground fault, SCR 110 will be rendered nonconductive. In that case, pull-in current will be supplied to the coil of device 10*a* as soon as line terminals 65 and 66 are reconnected to an appropriate power source.

The invention described herein thus achieves a resettable circuit interruption device that does not require any mechanical linkage between the push button and the contacts. The minimum number of moving parts greatly simplifies manufacture and assembly thereby reducing the cost and increasing reliability over prior devices.

While the invention has been shown and described with respect to particular embodiments thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A manually resettable ground fault circuit interrupter comprising a pair of normally open contacts, a housing, solenoid means slidably retained by said housing, a contact carrier attached to said solenoid means and having one of said contacts fixed thereon opposite the other contact, said solenoid means being slidable between a first position and a second position, means biasing said solenoid means towards said first position, said contacts being electronically open when said solenoid means is in said first position and said contacts being closed when said solenoid means is in said second position, and a manually actuated plunger which extends at least partially through said solenoid means and is magnetized when said solenoid means conducts a predetermined current, said plunger being slidable between a plunger first position and a plunger second position and being biased towards said plunger first position, such that when a predetermined current is conducted by said solenoid means and said plunger is manually actuated said plunger directly engages said solenoid means and upon release of said manual actuation moves said solenoid means to said second position, and when said solenoid means conducts an insufficient current said solenoid means is in said first position regardless of actuation of said plunger.

2. A circuit interrupter according to claim 1 wherein said solenoid means comprises a cylindrical coil wound on a bobbin with a central opening therethrough and a footplate attached at one end of said bobbin, one end of said plunger being adapted to slide within said central opening and to contact said footplate when said plunger is manually actuated, said plunger being magnetically held to said footplate when a predetermined current is conducted by said coil.

3. A circuit interrupter according to claim 2 further comprising two springs, one of said springs being disposed so as to bias said solenoid means toward said first position, and the other spring being disposed so as to bias said plunger toward said plunger first position.

4. A circuit interrupter according to claim 3 wherein said springs exert insufficient force to overcome the magnetic force holding said plunger and footplate together when a predetermined current is conducted by said solenoid means, and said plunger bias spring exerts a force on said plunger that is greater than the force exerted by said solenoid bias spring on said solenoid means.

5. A manually resettable switch device comprising a pair of normally open contacts, one of said contacts having a fixed position and the other contact being moveable relative to said fixed contact to make and break electrical continuity therewith, said moveable contact being mounted on a contact carrier, solenoid means slidably retained by a housing, manually actuable plunger means slideable within said solenoid means and magnetically engaging said solenoid means when said plunger means is manually actuated and a predetermined current is conducted by said solenoid means, said contact carrier being attached to said solenoid means for movement therewith such that when said plunger means and solenoid means are magnetically engaged said contacts are closed upon manual actuation of said plunger means, and biasing means to disengage said plunger means from said solenoid means to open said contacts whenever the solenoid means conducts less than a predetermined current.

6. Resettable switching apparatus for selectively interrupting an electrical connection comprising a pair of opposing contacts, a housing, solenoid means slideable in the housing between a first and a second position, a contact carrier mounted on said solenoid means and carrying one of said opposing contacts, means biasing said solenoid means toward said first position in which said contacts are open, and a plunger extending at least partially through said solenoid means and magnetizable to hold said solenoid means in said second position in which said contacts are closed when said solenoid means conducts a predetermined current.

7. Resettable switching apparatus as claimed in claim 6 wherein said plunger is magnetizable to move said solenoid means to said second position in response to a second predetermined current.

8. Resettable switching apparatus as claimed in claim 7 including means for detecting a ground fault, means responsive to detection of a ground fault for interrupting current to said solenoid means, and manually operable switch means for restoring current to said solenoid means to reset said solenoid means to said second position.

9. Resettable switching apparatus as claimed in claim 6 wherein said plunger is slidable between a plunger second position in which it is magnetizable when said solenoid means conducts said predetermined current and a plunger first position, and means biasing said plunger toward said plunger first position, said plunger moving said solenoid means to said second position to reset said switching apparatus when said plunger is moved to said plunger second position and said solenoid means conducts said predetermined current.

10. Resettable switching apparatus as claimed in claim 6 including a magnetic sleeve in said solenoid means surrounding said plunger, whereby said plunger is movable with said solenoid means when said predetermined current is conducted and is movable with respect to said solenoid means when less than said predetermined current is conducted.

* * * * *